United States Patent [19]
Herlan

[11] 3,974,728
[45] Aug. 17, 1976

[54] MULTI-PART PUNCH

[75] Inventor: Alton G. Herlan, Cheektowaga, N.Y.

[73] Assignee: Pivot Punch Corporation, Lockport, N.Y.

[22] Filed: Aug. 14, 1975

[21] Appl. No.: 604,727

[52] U.S. Cl. .................................. 83/686; 83/698
[51] Int. Cl.² ........................................... B26F 1/14
[58] Field of Search .......................... 83/686–689, 83/660, 698; 76/101 R

[56] References Cited
UNITED STATES PATENTS

| | | | |
|---|---|---|---|
| 2,299,534 | 10/1942 | DeLorme | 83/686 X |
| 2,622,682 | 12/1952 | Kopczynski | 83/686 |
| 2,808,108 | 10/1957 | Pellegrino | 83/686 X |
| 3,334,809 | 8/1967 | Zajic et al. | 83/686 X |
| 3,641,860 | 2/1972 | Whistler, Sr. et al. | 83/686 |

*Primary Examiner*—Frank T. Yost
*Attorney, Agent, or Firm*—Bean & Bean

[57] ABSTRACT

A punch is formed by heat hardening a tool steel body previously machined to define a punch body portion having an end opening cavity including a conical end opening portion and a cylindrical base portion; inserting a cylindrically shaped hard and abrasive resistant punch element into the cavity through the conical end portion for press-fit assembly within the cylindrical base portion; conductively heating the punch body immediately adjacent the conical end portion up to the melting temperature of a bonding material and overfilling a space defined by the conical end portion and the punch element with such bonding material, while preventing migration of hardness altering heat axially within the punch body away from the area of the cavity; air cooling the punch body to solidify the bonding material and thereby bond the punch element to the punch body; and grinding away overflow portions of the bonding material to provide a "radius" of bonding material blended into the punch element and body portion.

3 Claims, 5 Drawing Figures

MULTI-PART PUNCH

BACKGROUND OF THE INVENTION

Sheet metal punches have commonly been fabricated from a single piece of suitable steel to define an elongated body or punch mounting portion and a reduced diameter shank or piercing end portion, which portions are joined by an integral reenforcing fillet. This basic construction suffers from the disadvantage that the whole of the punch must be discarded in the event that there is a structural failure of the shank end portion or it becomes excessively worn after continued sharpening. Structural failure normally involves breaking of the shank end portion at approximately its junction with the reenforcing fillet, due to stresses created during the actual punching operation.

Over the years, many improvements have been made in one piece steel punches with a view to reducing the likelihood of structural failure. As by way of example, U.S. Pat. No. 2,431,567 discloses the utilization of a collar surrounding the junction between the shank end portion and fillet in order to provide a vibration absorbing support therefor.

Another approach, suggested for instance by U.S. Pat. Nos. 125,302; 770,238; 2,287,882; 2,323,756 and 2,808,108, has been to form a multi-part punch in order to permit replacement of a worn or broken shank end portion without the necessity of discarding the otherwise serviceable punch body portion. Punch constructions of this type have the added cost and structural design advantages of permitting the shank end and body portions of a punch to be formed from different types of steel, as for instance relatively high cost, high speed steel and a relatively low cost tool steel, respectively. However, the inherent drawback with such punch constructions is the inability to assemble the several parts in a manner providing for proper alignment of the parts and distribution of stresses encountered during the punching operation. As a result, the thickness of the material which may be punched without breakage of the replaceable shank end portion is limited to a thickness below that which may be successfully punched with a comparable one-piece punch.

In more recent years, it has been proposed to bond a "button" of tungsten carbide or other very hard, abrasive resistant material onto the tip end of the shank end portion of an otherwise integrally formed steel punch with a view to greatly increasing punch wear life, while maintaining to some extent the cost advantage of multi-part punch constructions. Again, however, certain drawbacks have been encountered. In this respect, very hard carbides, which have the best wear capabilities, present a serious problem with respect to the bonding of the "button" to the small tip end of shank end portion. For softer carbides, it is possible to achieve a reasonably adequate bond by procedures outlined in U.S. Pat. No. 3,279,049, but not without adversely influencing the quality of the steel punch body portion. In either case, there may be encountered fabricating problems in obtaining proper alignment of the "button" relative to the shank end portion in order to avoid the necessity of subsequent machine trimming operation.

Further, there have been prior attempts to form carbide punches by press fitting and/or brazing a generally cylindrical carbide punch element within a bore opening formed in a tool steel body, as disclosed for instance by U.S. Pat. No. 3,807,804. However, these prior attempts have involved high cost fabricating procedures and/or have resulted in punches having short useful life.

SUMMARY OF THE INVENTION

The present invention is directed towards an improved multi-part punch and method of forming same. More specifically, the present invention provides a simple and relatively low cost fabricating procedure by which a relatively high cost, hard and abrasive resistant punch element or piercing end portion may be permanently attached to a relatively low cost, tough punch body portion in a manner providing for proper stress distribution between the parts.

DRAWINGS

The nature and mode of operation of the present invention will now be more fully described in the following detailed description taken with the accompanying drawings wherein.

DETAILED DESCRIPTION

Figure 1:
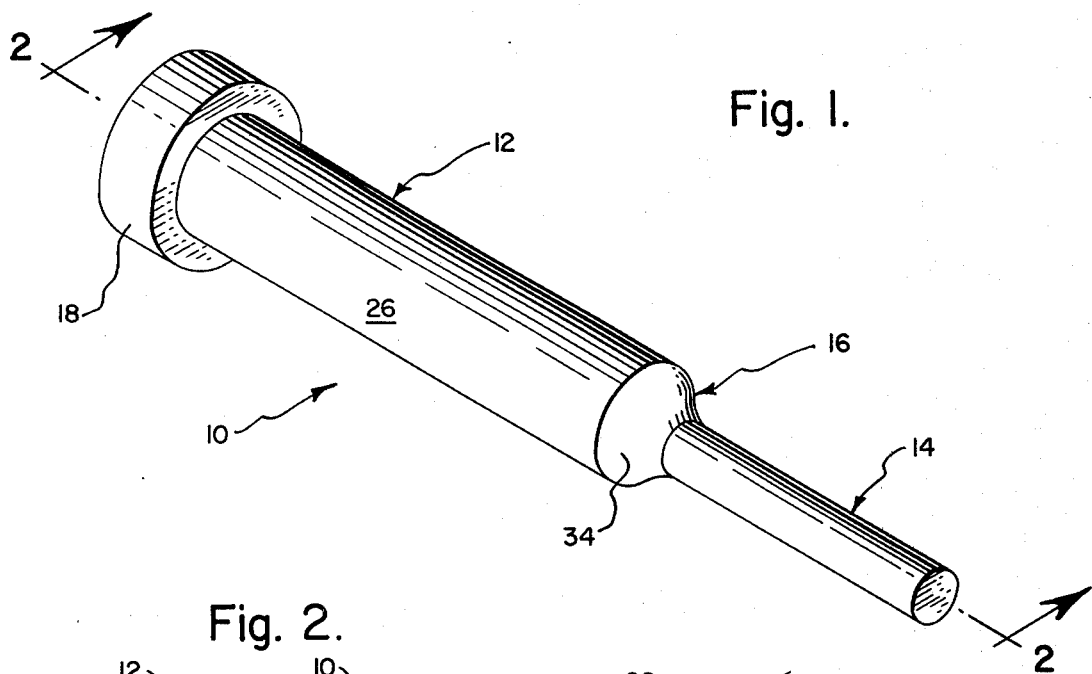
FIG. 1 is a perspective view of a punch embodying the present invention.
Figure 2:
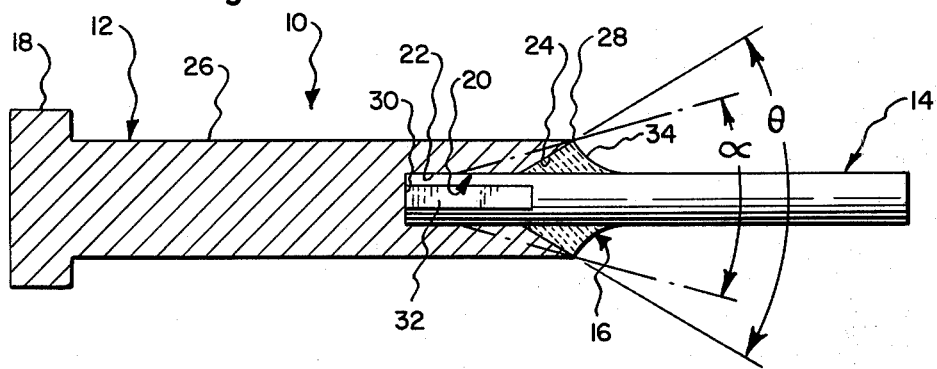
FIG. 2 is a sectional view taken generally along the line 2—2 in FIG. 1.

Reference is now made particularly to FIGS. 1 and 2, wherein a multi-part punch of the present invention is generally designated as 10. Punch 10 includes a body or punch mounting portion 12, a punch element or piercing end portion 14, and a bonding-vibration damping portion 16. Preferably, the diameter of body portion 12 will vary directly with the diameter of punch element 14 with the former being as small as possible, consistent with strength considerations and press installation requirements in order to minimize the overall cost of the punch and maximize the number of punches which may be accommodated within a given area of a press.

In accordance with a preferred form of the present invention, body portion 12 is formed from a relatively low cost, heat hardenable steel, such as tool steel; punch element 14 is formed of a relatively high cost, hard, abrasive and temperature resistant carbide, such as tungsten carbide; and bonding portion 16 is formed from a conventional brazing composition, such as silver solder, which may be generally characterized as having good elasticity, as compared to the material forming body portion 12, and high bond strength throughout the range of punch operating temperatures. However, where dictated by operational conditions and/or service requirements, other steels including high speed steel, other hard abrasive resistant materials including diamond and ceramics and other high melting temperature bonding-vibration damping materials capable of being bonded to both body portion 12 and punch element 14 may be used to advantage. The size and geometry of the portions of punch 10 will of course be determined by the size of hole and material to be punched, and punch press mounting requirements. In this latter connection, body portion 12 may be provided with an enlarged head 18 for use in attaching the punch to a press, not shown.

By referring to FIG. 2, it will be understood that body portion 12 is formed with a cavity 20, which opens through its working end and is adapted to partially receive punch element 14. Cavity 20 is characterized as including a cylindrical or straight portion 22, which is sized to receive punch element 14 in a press fit relationship, and a frusto-conical or flaired end opening portion 24, whose axial length varies inversely with cone angle. The axial length of cavity portion 22 need only be sufficient to insure that the inserted end of punch element 14 is firmly gripped by or anchored to body portion 12, ie. several punch element diameters.

Preferably, the cone angle of cavity portion 24 will vary between about $\alpha$ and $\theta$, which correspond essentially to 30° and 60°, respectively. In the illustrated punch construction featuring a minimum diameter punch body portion, frustoconical end opening portion 24 will intersect the cylindrical outer wall 26 of body portion 12 to define a relatively sharp annular rim 28, regardless of cone angle. Since, as previously mentioned, the diameter of body portion 12 would preferably be essentially directly proportional to the diameter of punch element 14, relatively large cone angles would normally be employed for punches having relatively small diameter punch elements in order to maximize the strength of body portion 12 adjacent rim 28. However, as a practical matter, the cone angle should not exceed about 60°, since otherwise the volume and/or effective axial length of bonding material present between the body portion and the punch element would be insufficient to provide proper vibration damping characteristics, and a sharp shear point would be established adjacent the juncture of cavity portions 22 and 24. On the other hand, while it is desirable to maintain the cone angle as small as possible in order to maximize the effective volume and effective axial length of the bonding material, the cone angle should not be less than about 30° even for relatively large diameter punches, since the required overall length of punch element 14 increases and the strength of body portion 12 decreases as cone angle decreases. It would be entirely unsatisfactory to excessively decrease the cone angle beyond 30°, since as cavity portion 24 tends to assume a cylindrical configuration, the overall diameter of punch body portion 12 must be substantially increased for any given punch element diameter. Moreover, this latter construction would not serve to confine the mass of bonding material in a manner permitting proper vibration absorption characteristics and a sharp shear point would be defined adjacent the juncture of cavity portions 22 and 24. For cone angles between about 30° and 60°, the shape of the bonding material and its size relative to the diameter of punch element 14 is effective to cushion or dampen vibrations imparted to the working or projecting end of the punch element during normal operating conditions.

The length of punch insert 14 is sufficient to permit its flat inserted end to bottom out against the flat transversely extending end abutment wall 30 of cylindrical portion 22 and its outer or punch end to extend forwardly of the punch body through a conventional or required working distance, which will depend upon the diameter of the punch element and/or the thickness of the material being punched. The base or inserted end of punch element 14 is preferably formed with a ground "flat" 32, having a length slightly in excess of the length of cavity cylindrical portion 22.

Bonding portion 16 is shown in FIG. 2 as essentially uniformly filling the space between punch element 14 and the walls of cavity 20 and as defining a concave fillet 34, which encircles the punch element immediately beyond the working end of body portion 12. Preferably, fillet 34 is shaped to intersect with the surface of punch element 14 in a tangential relationship. Fillet 34 aids in the vibration damping quality of the punch and cooperates with that portion of the bonding material arranged within conical cavity portion 24 to maximize the volume of bonding material available for stress distribution without adversely changing the strength characteristics of the body portion of the punch. To be effective for purposes of the present invention, the bonding material must have good elastic properties and high-temperature bond strength such that it will not be subject to plastic deformation or steel-carbide bond failure under normal high frequency vibration punch element operating conditions occurring throughout the range of punch working temperatures, i.e. between "room" start up and upwards of about 1000°F operating temperatures.

As by way of example, a punch essentially identical in appearance to that shown in FIG. 2 has been fabricated using M2 Tool Steel heat treated to a 60–62 Rockwell Hardness for the body portion 12; a commercially available tungsten carbide for the punch element 14; and Eutec Sil 1020 FC, which is a silver brazing compound having a 1050°F bonding temperature, for the bonding portion 16. A punch element having a diameter of 0.100 inch and a length of approximately one inch was press fitted within a cavity cylindrical portion having a length of 0.025 inches and a diameter of approximately 0.099 inch. The diameter of body portion was 0.25 inch, and a 60° cone angle was employed. The overall length of the punch was approximately 2 inches.

A preferred method of forming punches in accordance with the present invention comprises the steps of machining a tool steel blank, while in an annealed state, to define body portion 12 with cavity 20 disposed essentially concentrically of cylindrical outer wall 26 and with end wall 30 disposed to extend radially of the center line or axis of cavity 20. Body portion 12 is then heat hardened and subsequently ground as required to insure concentricity between the cavity and the cylindrical outer wall and remove scale. Punch element 14 is formed by grinding commercially available solid carbide cylindrical stock material to a diameter approximately 0.001 inches in excess of the finished diameter of cylindrical portion 22 and to define "shallow"flat 32 having a length slightly in excess of the axial length of cylindrical portion 22. Punch element 14 is then press fitted into cavity 20 with its inserted end forced into abutting, face-to-face engagement with end wall 30, as indicated in FIG. 3A; flat 32 allowing escape of trapped air in order to insure proper seating of the punch element.

Figures 3A, 3B, 3C:
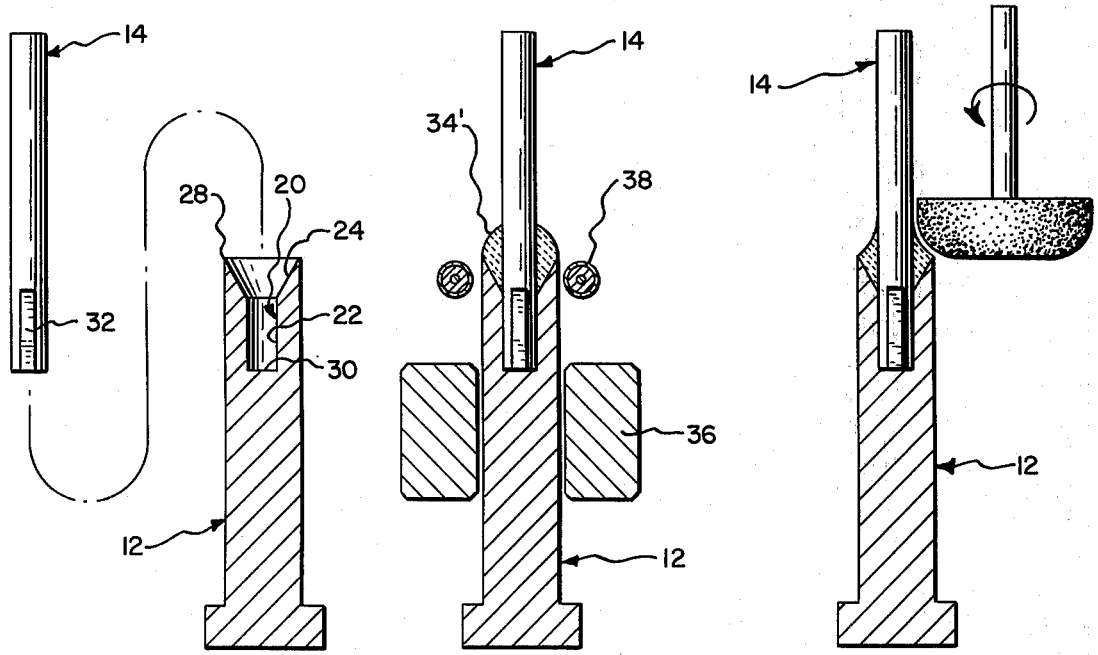
FIGS. 3a–3c are views illustrating steps involved in producing the punch in FIG. 1.

A heat sink 36 formed of aluminum or other suitable heat conductive material is then clamped to body portion 12 in the area of end wall 30, as generally indicated in FIG. 3B. With heat sink 36 attached to body portion 12 in this manner, the surfaces of punch element 14 and body portion 12 bounding cavity 20 are conductively or otherwise heated, as by device 38, to a bonding temperature slightly exceeding the melting temperature of the bonding material, which in turn must exceed the expected working temperature of the punch. The space between the cavity wall surfaces and punch element is then filled with bonding material to overflowing, so as to form a convex bead 34' from which fillet 34 will be subsequently formed. The bonding material may be in a molten condition, prior to introduction into the cavity or rendered molten incident to its introduction thereinto. The punch is allowed to air cool to a temperature below the expected working temperature of the punch and preferably below about 100°F, whereafter heat sink 36 is removed and the punch ground to remove scale from the previously heated end of body portion 12 in order to finish the exposed surface of punch element 14 and to form fillet 34, as indicated in FIG. 3C. The utilization of heat sink 36 is critical to the practice of the present invention in that it serves to draw heat away from the body portion immediately adjacent end wall 30 and prevent the body portion immediately adjacent to and beyond end wall 30 in a direction away from its working end from reaching a temperature at which the hardened steel will become tempered. In the absence of heat sink 36, this area of the body portion would be subject to loss of hardness and thus lead to migration of the hard carbide punch element into the body portion beyond end wall 30 during use and result in failure of the bond between the punch element and body portion.

I claim:

1. A punch comprising in combination:
    a heat hardened steel body portion, said body portion having a generally cylindrical outer wall and a concentrically arranged cavity opening through its working end, said cavity including a conical end opening portion and a cylindrical base portion, said conical end opening portion defining a total cone angle of between about 30° and 60°, said base portion defining a flat transversely extending end abutment wall;
    a cylindrical punch element formed of a hard abrasive resistant material, said punch element having one end press fit received within said base portion in face-to-face abutting engagement with said abutment wall and having an opposite punch end protruding from said cavity axially beyond said working end; and
    a bonding-vibration damping material filling said cavity between said body portion and said punch element and defining a concave fillet encircling said punch element immediately beyond said working end, said bonding-vibration damping material being relatively elastic as compared to said body portion and providing a bond between said body portion and said punch element throughout the range of punch operating temperatures.

2. A punch according to claim 1, wherein said conical end opening portion intersects with said cylindrical outer wall to define a relatively sharp annular rim, and said concave fillet intersects with said punch element in a tangential relationship and extends therefrom to said annular rim.

3. A punch comprising in combination:
    a heat hardened steel body portion, said body portion having a cavity opening through its working end, said cavity including a conical end opening portion and axially aligned cylindrical base portion, said conical end opening portion defining a total cone angle of between about 30° and 60°, said base portion defining a flat transversely extending end abutment wall;
    a punch element formed of a hard abrasive resistant material, said punch element having one end press fit received within said base portion in face-to-face abutting engagement with said abutment wall and having an opposite punch end protruding from said cavity axially beyond said working end; and
    a bonding material for bonding said punch element to said body portion, said bonding material filling said cavity between said body portion and said punch element and defining a concave fillet encircling said punch element immediately beyond said working end, said bonding material being characterized as being capable of withstanding plastic deformation and body portion-punch element bond failure under high frequency vibration punch element operating conditions occurring throughout the range of punch operating temperatures.

* * * * *